US007887896B2

(12) United States Patent
Palizzi

(10) Patent No.: US 7,887,896 B2
(45) Date of Patent: Feb. 15, 2011

(54) FABRIC FILLET

(76) Inventor: Bonnie Palizzi, 2430 Thistle Pointe, Bloomfield Hills, MI (US) 48304

( * ) Notice: Subject to any disclaimer, the term of this patent is extended or adjusted under 35 U.S.C. 154(b) by 418 days.

(21) Appl. No.: 11/405,079

(22) Filed: Apr. 17, 2006

(65) Prior Publication Data

US 2006/0230698 A1 Oct. 19, 2006

Related U.S. Application Data

(60) Provisional application No. 60/672,827, filed on Apr. 19, 2005.

(51) Int. Cl.
*B32B 9/00* (2006.01)

(52) U.S. Cl. ......................... 428/102; 428/103; 52/417; 52/454; 52/42; 442/42

(58) Field of Classification Search ................. 428/102, 428/103; 52/417, 454, 42; 442/42
See application file for complete search history.

(56) References Cited

U.S. PATENT DOCUMENTS

| | | | | |
|---|---|---|---|---|
| 2,126,167 | A | 8/1938 | Breackevelt | |
| 2,189,137 | A | 2/1940 | Eichner | |
| 2,308,918 | A | 1/1943 | Hertel et al. | |
| 2,750,314 | A * | 6/1956 | Bemmels | 442/151 |
| 2,985,977 | A | 5/1961 | Roseman | |
| 3,095,661 | A | 7/1963 | Ellis | |
| 3,231,951 | A | 2/1966 | De Armond | |
| 3,968,614 | A | 7/1976 | Wallace | |
| 3,981,091 | A | 9/1976 | Wiener, Jr. | |
| 4,052,830 | A | 10/1977 | Smith | |
| 4,475,296 | A * | 10/1984 | Fremstad | 40/794 |
| 4,478,545 | A | 10/1984 | Mizusawa et al. | |
| 4,759,981 | A * | 7/1988 | Weil | 428/343 |
| 5,688,569 | A * | 11/1997 | Gilmore et al. | 428/31 |
| 6,169,042 | B1 * | 1/2001 | Braun | 442/42 |

* cited by examiner

*Primary Examiner*—Mark Ruthkosky
*Assistant Examiner*—Tamra L Amakwe
(74) *Attorney, Agent, or Firm*—Miller, Canfield, Paddock and Stone; John H. Engelmann

(57) ABSTRACT

A fillet is disclosed for enhancing the appearance of a frame or mat and comprises a flexible material, an elastomeric cord and an adhesive securing the fabric to the cord. The flexible material may have one or more flairs which may have a tape adhesive which adheres the flairs to the frame, the matt, or parts of both of the frame and the mat. The fillet is flexible and may be bent to various geometries.

13 Claims, 4 Drawing Sheets

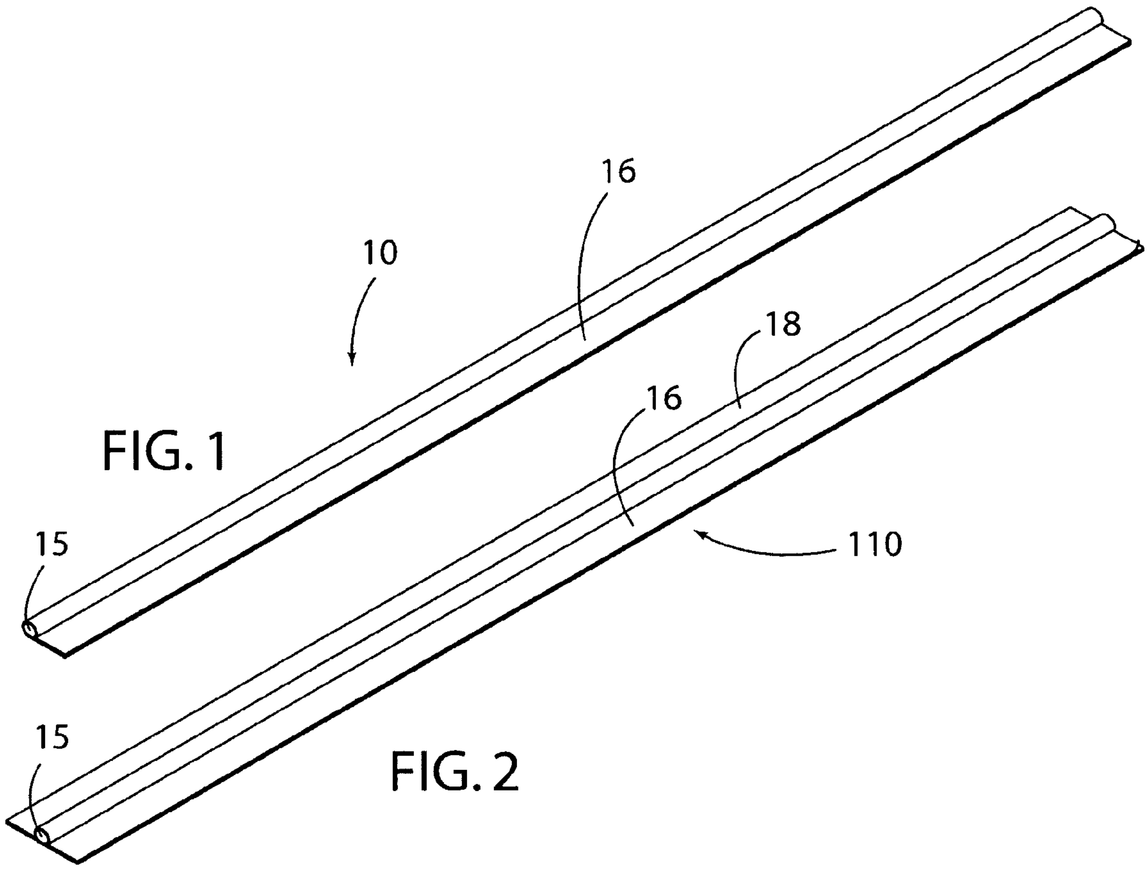
FIG. 1
FIG. 2
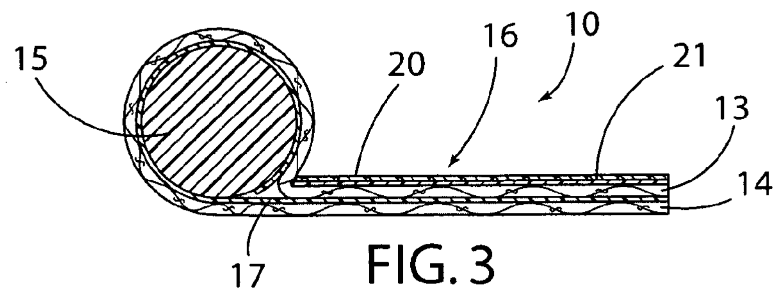
FIG. 3
FIG. 4
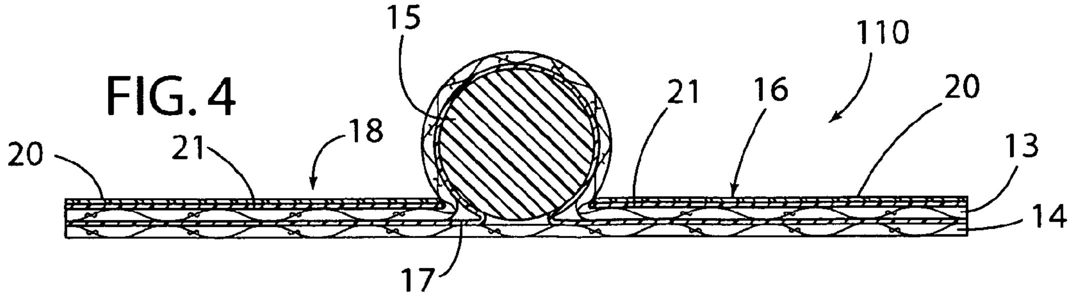

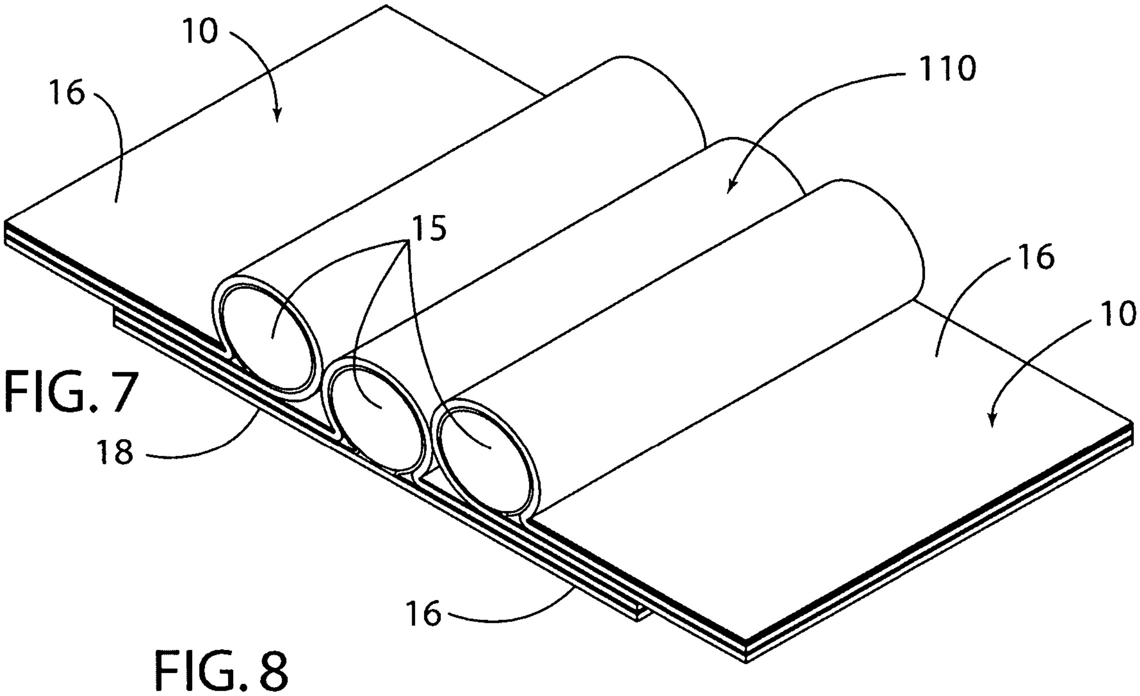
FIG. 7
FIG. 8
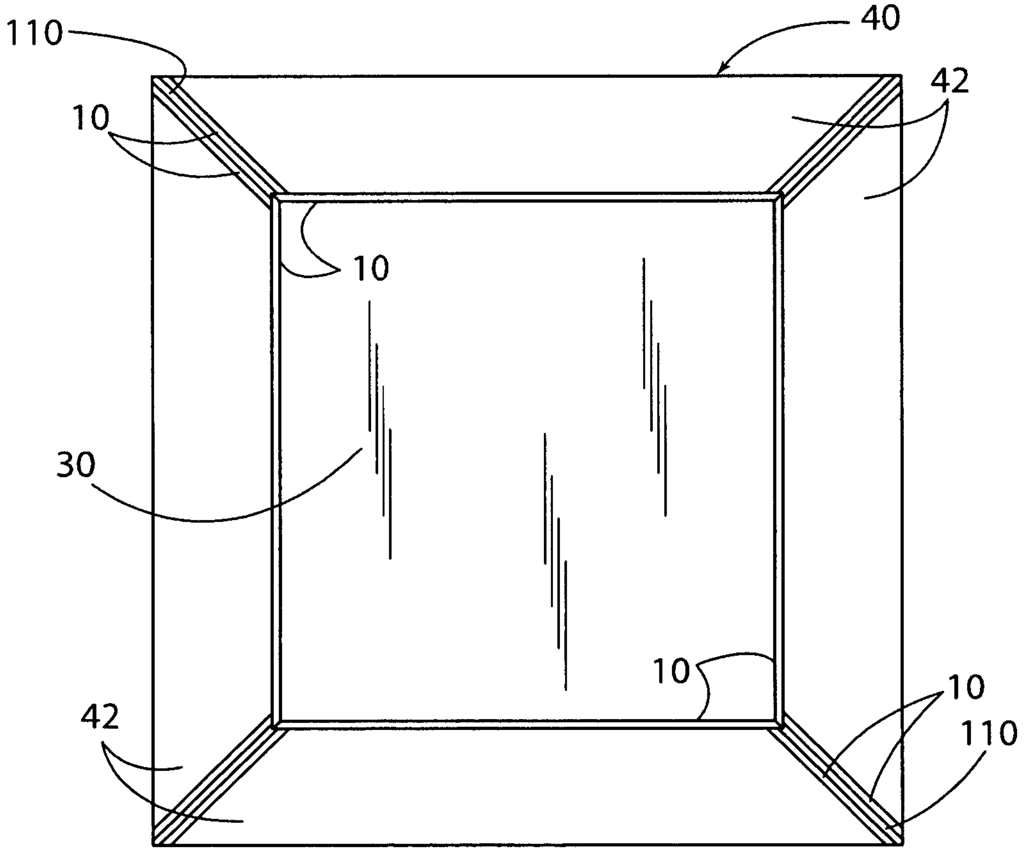

FABRIC FILLET

RELATED APPLICATION

This application claims priority benefit of U.S. provisional patent application No. 60/672,827 filed on Apr. 19, 2005.

FIELD OF THE INVENTION

This invention relates to improvements in matting and framing of works of art, and more particularly to improved fillets for aesthetically pleasing presentation of artwork.

BACKGROUND OF THE INVENTION

A fillet is a thin section of material used as a separator and an enhancement, typically an enhancement added between matting, frames or moldings to embellish a frame design. Typically fillets are used to enhance the presentation of a portrait, painting, framed images and the like. Known fillets used with matting and framing are made of wood strips that are rigid and require special, expensive tools to cut to size. Also, due to limitations in the tooling and to limitations inherent in the material selection, the wood fillets are restricted to straight edges and forty-five degree angle applications, greatly limiting design freedom.

Moreover, acid in wood can leach onto the material surrounding the wood fillet, potentially damaging such material. Also, wood fillets may warp or chip, are relatively heavy and are relatively bulky to store. It would be desirable to provide a fillet which is easy to form and to adjust, which accommodates a wide variety of shapes and sizes of artwork and which can be manufactured in a wide variety of shapes and sizes.

SUMMARY OF THE INVENTION

In accordance with a first aspect, a fillet is disclosed for enhancing the appearance of a frame or mat and comprises a flexible material, an elastomeric cord and an adhesive securing the fabric to the cord. The fabric may have one or more flairs which may have a tape adhesive which adheres the flairs to the frame, the matt, or parts of both of the frame and the mat.

From the foregoing disclosure and the following more detailed description of various preferred embodiments it will be apparent to those skilled in the art that the present invention provides a significant advance in the technology of matting and framing. Particularly significant in this regard is the potential the invention affords for providing a high quality, low cost fillet which allows for creative design variation. Additional features and advantages of various preferred embodiments will be better understood in view of the detailed description provided below.

BRIEF DESCRIPTION OF THE DRAWINGS

FIG. 1 is a perspective view of a fabric fillet in accordance with a preferred embodiment having a single flair.

FIG. 2 is a perspective view of an alternative preferred embodiment of a fabric fillet with dual flairs.

FIG. 3 is a cross section view of the fabric fillet of FIG. 1.

FIG. 4 is a cross section view of the fabric fillet of FIG. 2.

FIG. 7 shows an example of stacked fillets in accordance with a preferred embodiment.

FIG. 8 is another example of the use of fabric fillets around a work of art, and shows three fillets placed immediately adjacent to one another.

Figure 5:
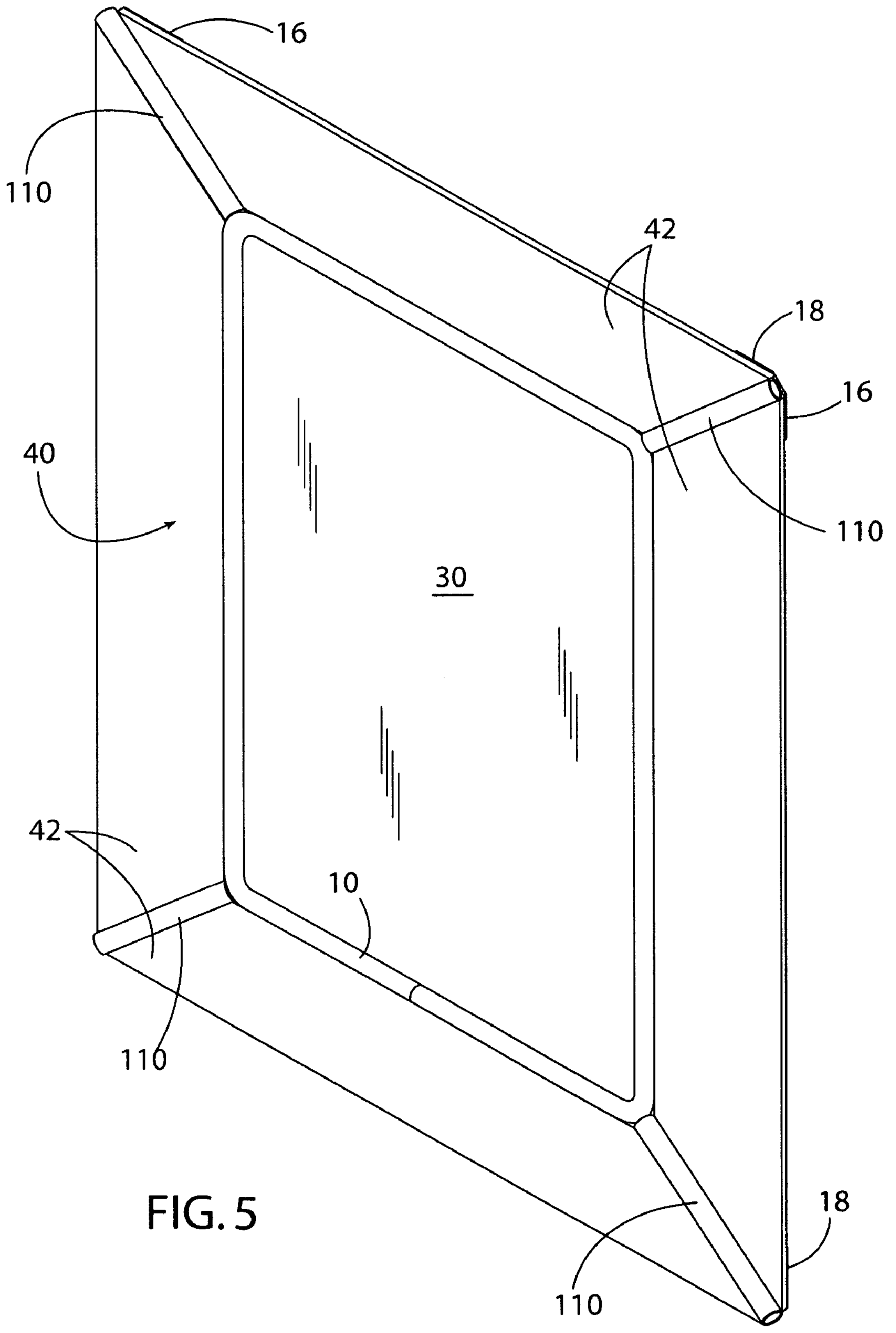
FIG. 5 is an example of the use of fabric fillets around a work of art, aesthetically separating mat pieces from the painting.

It should be understood that the appended drawings are not necessarily to scale and present a somewhat simplified representation of various preferred features illustrative of the basic principles of the invention. The specific design features of the fillet as disclosed here will be determined in part by the particular intended application and use environment. Certain features of the illustrated embodiments have been enlarged or distorted relative to others to enhance visualization and clear understanding. In particular, thin features may be thickened, for example, for clarity of illustration. All references to direction and position, unless otherwise indicated, refer to the orientation illustrated in the drawings.

DETAILED DESCRIPTION OF THE PREFERRED EMBODIMENTS

It will be apparent to those skilled in the art, that is, to those who have knowledge or experience in this area of technology, that many uses and design variations are possible for the fabric fillet disclosed here. The following detailed discussion of various alternative and preferred features and embodiments will illustrate the general principles of the invention with reference to a fillet particularly suitable for use with matted or framed art. Other embodiments suitable for other applications will be apparent to those skilled in the art given the benefit of this disclosure.

Referring now to the drawings, FIG. 1 shows a fabric fillet 10 comprising a cord 15 and a single flair 16. Fabric fillet 10 may be a generally elongate and flexible material including, for example, a fabric, paper, metal foil, leather, etc., which advantageously may be easily cut with scissors, a knife, etc. The term flexible, as used herein, refers to fillets which are bendable such that they can non-destructively adapt a curved shape, including a right angle shape. Generally the cord has a length and the fillet flairs run along the length of the cord. FIG. 2 shows an alternate fabric fillet 110 with two flairs 16, 18, each flair extending along the cord on a side opposite the other, and extending so as to generally co-planar. Either embodiment of the fabric fillets or both may be applied to extend the dimensions of a frame or mat or as a decorative separation to add to a design. Artwork is understood herein broadly to include paintings, portraits, mirrors, advertising, etc., and other items which the fillet is designed to segregate from one another. Double flair designs may be used to separate multiple pieces of artwork from one another (e.g., two portraits standing side by side).

FIG. 3 shows a cross section view taken through single flair fabric fillet 10 of FIG. 1. Fabric has a top layer 13 and a bottom layer 14 which cooperate to preferably circumferentially surround the cord 15. The fabric may be any one of a number of fabrics, woven materials and the like, and may also include leather. Preferably the cord is a flexible cord such as an elastomeric or rubber cord supplied by Fire Mountain of Grant's Pass, Oreg. A thin layer of cord adhesive 17 may be used to secure the fabric to the cord and to itself along the flair. Examples of suitable adhesives include an hot-melt adhesive such as Miracle Muck®. Optionally a pressure sensitive adhesive strip or tape 20 may be applied to the top 13 of the flair to secure the fabric fillet to a mat or frame. Preferably the tape adhesive 21 from the tape remains with the top layer at the flair as the tape is removed, allowing the fillet to be bonded to another substrate, such as matting.

FIG. 4 shows the double flair embodiment 110 of FIG. 2. As with the single flair embodiment 10 of FIGS. 1 and 3, the fabric layers 13 and 14 preferably entirely surround the cord and are bonded to the cord 15 and to each other with a hot melt adhesive. However, for the double flair embodiment, separate layers are used.

Figure 6:
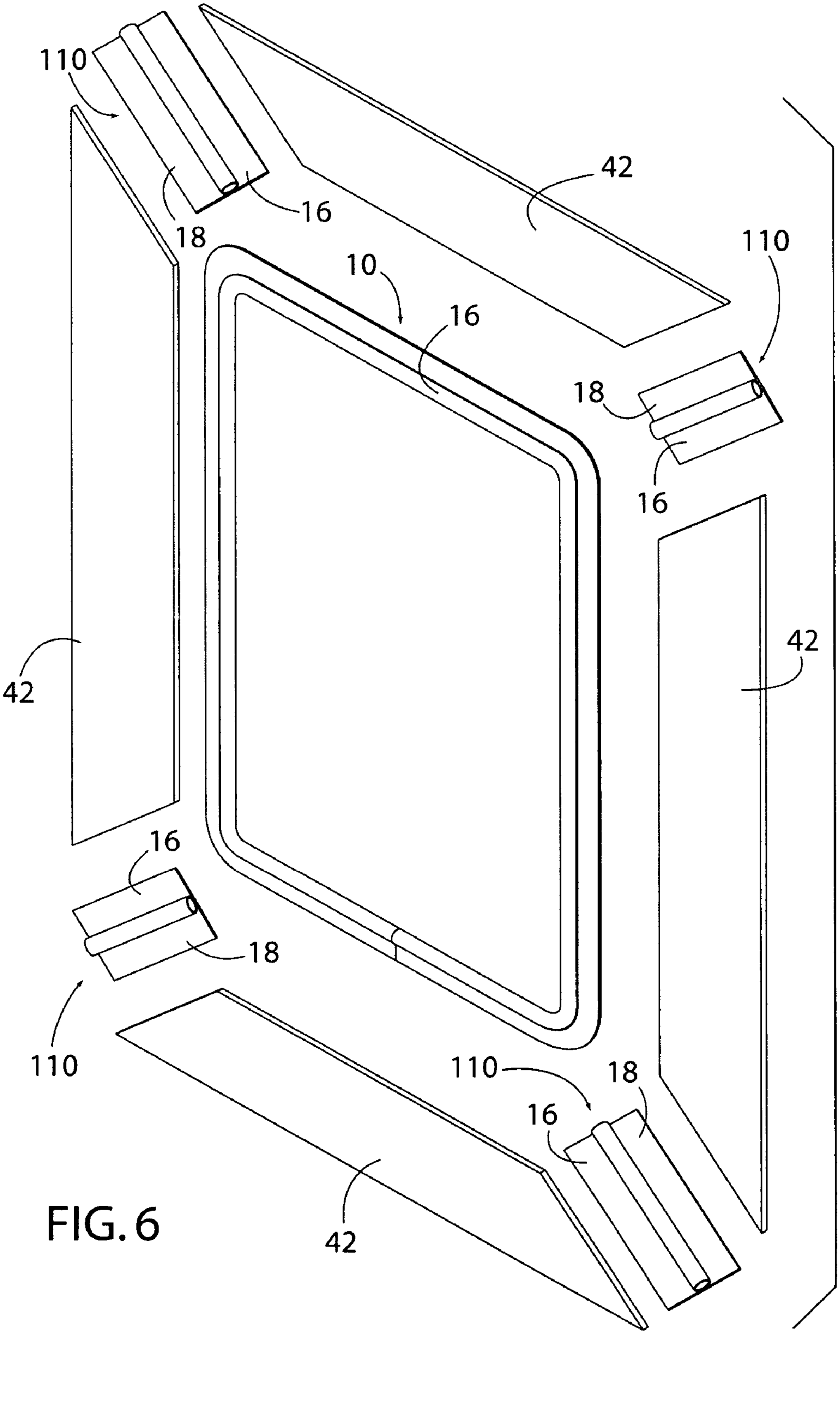
FIG. 6 is an exploded perspective view of the painting, mat pieces and fillets of FIG. 5.

FIG. 5 shows a preferred embodiment where the fillets 10, 110 are used in combination with matting 40 to frame a portrait 30. Matting 40 comprises a series of trapezoidal pieces 42, for example, a whiteboard foam which aesthetically covers edges of a frame and helps position the artwork. Four trapezoidal pieces 42 define a central area 30 where a portrait, photo, advertisement or other artwork may be presented. A single piece, single flair fabric fillet 10 is bent at four right angles so that it extends circumferentially around the central area 30. The flair is hidden under the trapezoidal matting pieces, and the cord is positioned generally adjacent an edge of the matting pieces. Four double flair fabric fillets 110 extend radially away from the single flair fabric fillet. The flairs 16, 18 of the fillet 10 are hidden behind matting 42. FIG. 6 shows an exploded perspective view exposing the flairs 16, 18.

FIGS. 7-8 are another preferred embodiment showing another highly advantageous feature. Because the fabric fillets are thinner than known wood fillets, multiple fillets may be positioned generally adjacent or stacked together to produce an aesthetically pleasing effect. Here, three fillets 10, 110 and 10 are stacked together so that each fillets cord 15 is positioned generally adjacent one another. The three stacked fillets 10, 110, 10 may, for example, be positioned as shown in FIG. 8, extending radially away from four single flair fillets 10. Other combinations of single flair and double flair fabric fillets will be readily apparent to those skilled in the art, given the benefit of this disclosure.

Use of fabric fillets as disclosed herein are advantageous in that the fabric fillet does not require special tooling to cut to fit: it may be cut with scissors. Further, the flexibility of the fabric allows such fillets to be bent to accommodate curved or irregular geometries in mats and/or frames, including circles and ovals. Such fillets as disclosed herein can be rolled and easily shipped and stored, greatly reducing required storage space.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fillet for enhancing a frame or mat comprising, in combination:

a flexible material;

an elastomeric cord having a length, wherein the flexible material extends along the length of the elastomeric cord;

wherein the flexible material extends beyond the elastomeric cord to define a flair;

a cord adhesive securing the flexible material to the elastomeric cord;

a tape applied to the flair; and a pressure sensitive tape adhesive separate from the cord adhesive, positioned on top of the flexible material;

wherein the pressure sensitive tape adhesive provides an adhesive surface to the flair, the flexible material surrounding the cord, and the fillet has a non-uniform cross section.

2. The fillet of claim 1 wherein the cord adhesive surrounds the length of the cord.

3. The fillet of claim 1 wherein the flexible material comprises a top layer and a bottom layer, the cord adhesive is positioned between the top layer and the bottom layer, and the tape adhesive is positioned on the top layer at the flair permitting attachment of the fillet to a frame or a mat.

4. The fillet of claim 1 wherein the flexible material has a top layer and a bottom layer, and the cord is positioned between the top layer and the bottom layer.

5. The fillet of claim 4 wherein the flexible material is formed as a single piece.

6. The fillet of claim 4 wherein the top layer comprises a first piece of flexible material and the bottom layer comprises a second piece of flexible material.

7. The fillet of claim 1 wherein the flexible material comprises a pair of flairs, with each flair extending along the length of the cord, and with the cord positioned between the flairs.

8. The fillet of claim 7 wherein the flairs are generally co-planar with one another.

9. The fillet of claim 1 wherein the frame comprises at least one matting piece, at least one fillet is positioned so that the cord is generally adjacent an edge of at least one matting piece.

10. The fillet of claim 1 wherein a fillet is bendable into a right angle.

11. The fillet of claim 1 wherein the frame comprises four matting pieces which define a central area, and the fillet extends as a single piece circumferentially around the central area.

12. The fillet of claim 1 further comprising a second fillet having a second cord, wherein the cord of the fillet is positioned generally adjacent the second cord of the second fillet.

13. The fillet of claim 1 wherein the flexible material comprises one of fabric, metal foil, paper and leather.

* * * * *